(12) United States Patent
Ro et al.

(10) Patent No.: US 12,523,314 B2
(45) Date of Patent: Jan. 13, 2026

(54) SOLENOID ACTUATOR

(71) Applicant: UNICK CORPORATION, Gimhae-si (KR)

(72) Inventors: Eui-Dong Ro, Gimhae-si (KR); Chan-Shik Ahn, Gimhae-si (KR); Ji-Hoon Park, Gimhae-si (KR); Jeong-Hyun Seo, Gimhae-si (KR)

( * ) Notice: Subject to any disclaimer, the term of this patent is extended or adjusted under 35 U.S.C. 154(b) by 59 days.

(21) Appl. No.: 18/683,483

(22) PCT Filed: Aug. 16, 2022

(86) PCT No.: PCT/KR2022/012167
§ 371 (c)(1),
(2) Date: Feb. 13, 2024

(87) PCT Pub. No.: WO2023/022460
PCT Pub. Date: Feb. 23, 2023

(65) Prior Publication Data
US 2024/0353018 A1 Oct. 24, 2024

(30) Foreign Application Priority Data

Aug. 18, 2021 (KR) .................. 10-2021-0108765

(51) Int. Cl.
*F16K 27/02* (2006.01)
*F16K 31/06* (2006.01)
(Continued)

(52) U.S. Cl.
CPC ........ *F16K 27/029* (2013.01); *F16K 31/0655* (2013.01); *H01F 7/1607* (2013.01); *H01F 27/325* (2013.01); *H01F 2007/062* (2013.01)

(58) Field of Classification Search
USPC ................. 251/129.15; 439/620.05
See application file for complete search history.

(56) References Cited

U.S. PATENT DOCUMENTS 2,458,123 A * 1/1949 Wasserlein .......... F16K 31/0655
335/262
3,013,768 A * 12/1961 La Mastra .......... F16K 31/0627
335/251
(Continued)

FOREIGN PATENT DOCUMENTS

CN      102537479 A    7/2012
EP        0852670 B1    5/2000
(Continued)

OTHER PUBLICATIONS

Supplementary Partial Europian Search Report on corresponding European Patent Application EP 22858697.0-1211 mailed on Oct. 31, 2024.

(Continued)

*Primary Examiner* — Matthew W Jellett

(57) ABSTRACT

A solenoid actuator capable of improving operational reliability by preventing the components stored inside the case from being deformed by externally applied forces includes: a hollow case formed with open top and bottom surfaces, a hollow housing integrated with a connector for power and signal transmission and mounted inside the case, a bobbin assembly mounted inside the housing and connected to the connector, a core penetrating the bobbin assembly, coupled to cover the top of the case and the housing, and having an operating space formed inside, a cover covering the bottom of the case, the housing, and the core, a plunger movably installed in the operating space, a rod coupled to penetrate through the core and movable by the plunger, and a deformation prevention means provided between the bobbin assembly and the core, preventing deformation and movement of components stored inside the case.

5 Claims, 6 Drawing Sheets

(51) Int. Cl.
  *H01F 7/16* (2006.01)
  *H01F 27/32* (2006.01)
  *H01F 7/06* (2006.01)

(56) References Cited

U.S. PATENT DOCUMENTS

| | | | | |
|---|---|---|---|---|
| 3,653,630 | A * | 4/1972 | Ritsema | F16K 31/0658 |
| | | | | 251/129.15 |
| 5,094,264 | A * | 3/1992 | Miller | F16K 31/0675 |
| | | | | 251/129.15 |
| 5,845,672 | A * | 12/1998 | Reuter | B60T 8/3675 |
| | | | | 303/119.2 |
| 6,144,275 | A * | 11/2000 | Hirata | H01F 7/06 |
| | | | | 335/262 |
| 8,925,585 | B2 * | 1/2015 | Yasoshima | F16K 31/0613 |
| | | | | 137/625.65 |
| 10,087,901 | B2 * | 10/2018 | Marechal | F16K 27/029 |
| 10,155,126 | B2 * | 12/2018 | Schwobe | F16K 31/0675 |
| 10,574,114 | B2 * | 2/2020 | Carroll | H02K 5/08 |
| 10,890,271 | B2 * | 1/2021 | Numazaki | F16K 27/029 |
| 11,525,523 | B2 * | 12/2022 | Fontaine | F16K 37/0041 |
| 11,710,591 | B2 * | 7/2023 | Lee | F16K 27/029 |
| | | | | 251/129.15 |
| 2007/0017587 | A1 * | 1/2007 | Groschel | F16K 31/06 |
| | | | | 137/625.65 |
| 2009/0130868 | A1 * | 5/2009 | Schenk | H01R 4/183 |
| | | | | 335/281 |
| 2014/0001386 | A1 * | 1/2014 | Chuang | F16K 31/0655 |
| | | | | 251/129.15 |
| 2015/0147912 | A1 * | 5/2015 | Lutz | H01R 13/5045 |
| | | | | 439/620.05 |
| 2017/0370495 | A1 * | 12/2017 | Markley | H01F 7/128 |
| 2020/0041025 | A1 * | 2/2020 | Murata | F16K 31/0675 |
| 2024/0060573 | A1 * | 2/2024 | Shakudo | F16K 27/029 |

FOREIGN PATENT DOCUMENTS

| | | |
|---|---|---|
| JP | 2020-043274 A | 3/2020 |
| KR | 20000032330 A | 6/2000 |
| KR | 20020027080 A | 4/2002 |
| KR | 20080007479 A | 1/2008 |
| KR | 20090013248 U | 12/2009 |
| KR | 20170115654 A | 10/2017 |
| KR | 102040860 B1 | 11/2019 |

OTHER PUBLICATIONS

International Search Report and Written Opinion dated Nov. 8, 2022, for corresponding PCT Application No. PCT/KR2022/012167.

* cited by examiner

SOLENOID ACTUATOR

CROSS-REFERENCE TO RELATED APPLICATION(S)

This application is a U.S. National Stage Application of PCT International Application No. PCT/KR2022/012167, filed on Aug. 16, 2022, which claims priority to Korean Patent Application No. 10-2021-0108765, filed on Aug. 18, 2021, both of which are incorporated herein by reference in their entireties.

BACKGROUND

Technical Field

The present disclosure relates to a solenoid actuator, and more particularly, to a solenoid actuator installed in the engine and powertrain of an automobile to operate valves that regulate the flow of fluids such as fuel and oil or control pressure.

Background Art

Typically, a solenoid actuator is installed in the powertrain, including the engine of an automobile, to control the flow of fluids such as fuel, coolant, and oil, and to regulate the pressure of the fluids.

For example, in the fuel system, it controls the supply and injection of fuel, while in the cooling system, it regulates the circulation of lubricant and coolant. Additionally, in the power transmission system, it controls the operation of friction elements such as clutches by adjusting fluid pressure, facilitating the implementation of various gear ratios.

In Korean patent registration No. 10-2040860 (Oct. 30, 2019), a solenoid actuator is disclosed.

The solenoid actuator is composed of a case, a bobbin assembly located inside the case and generating a magnetic field when power is supplied, a core inducing the magnetic field, a plunger moved by the induced magnetic field, and a rod propelled by the plunger.

The case of the solenoid actuator is coated or curled to fit tightly to the cover prevent deformation or movement of the components stored inside the case.

Nevertheless, continuous operation of the solenoid actuator in harsh conditions for an extended period poses a challenge, subjecting the components stored inside the case to deformation due to externally applied forces, leading to malfunction.

Furthermore, there has been an issue with traditional solenoid actuators during installation, as they require changing the case to one suitable for the specific system due to varying assembly reference surfaces in different systems.

SUMMARY

The present disclosure has been conceived to solve the above problems and it is an object of the present disclosure to provide a solenoid actuator capable of improving operational reliability by preventing the components stored inside the case from being deformed by externally applied forces.

It is another object of the present disclosure to provide a solenoid actuator capable of being applied to system-wise assembly reference surfaces without need for case replacement.

A solenoid actuator of the present disclosure includes a hollow case formed with both top and bottom surfaces open, a hollow housing integrated with a connector for power and signal transmission and mounted inside the case, a bobbin assembly mounted inside the housing and connected to the connector, a core penetrating the bobbin assembly, coupled to cover the top of the case and the housing, and having an operating space formed inside, a cover covering the bottom of the case, the housing, and the core, a plunger movably installed in the operating space, a rod coupled to penetrate through the core and movable by the plunger, and a deformation prevention means provided between the bobbin assembly and the core, preventing deformation and movement of components stored inside the case.

In addition, the solenoid actuator of the present disclosure may further include a spacer coupled to the upper surface of the case.

The solenoid actuator configured as described above is advantageous in terms of preventing the components stored inside the case from being deformed or moving by external forces by providing deformation prevention means through pressurization between the bobbin assembly and the core.

This can prevent malfunctions caused by deformation of components, improving the operating reliability of the solenoid actuator.

The present disclosure is also advantageous in terms of being universally applied to various system assembly reference surfaces by adjusting the assembly reference surface through the addition of a spacer on the upper surface of the case.

The advantages of the present disclosure are not limited to the aforesaid, and other advantages not described herein may be clearly understood from the descriptions below.

DETAILED DESCRIPTION

Figure 1:
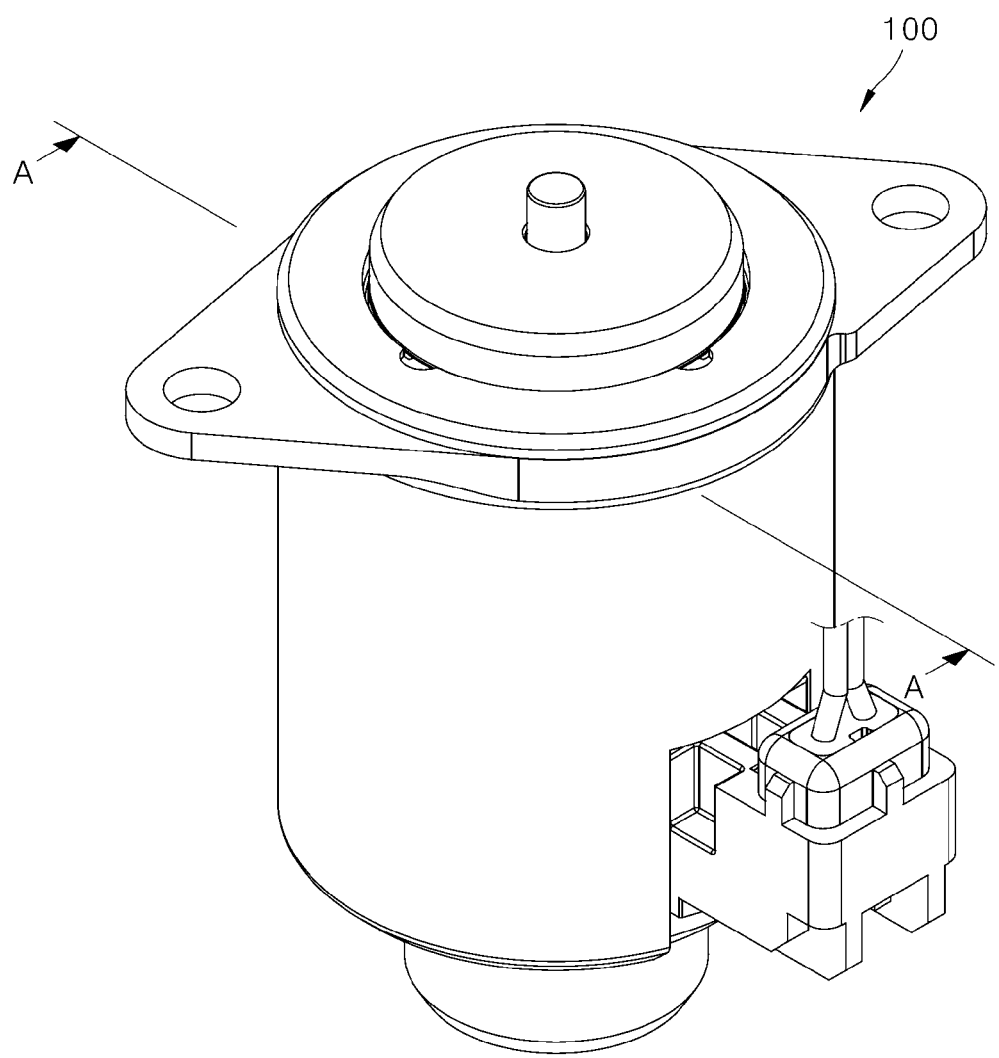
FIG. 1 is a perspective view of a solenoid actuator according to an embodiment of the present disclosure.
Figure 2:
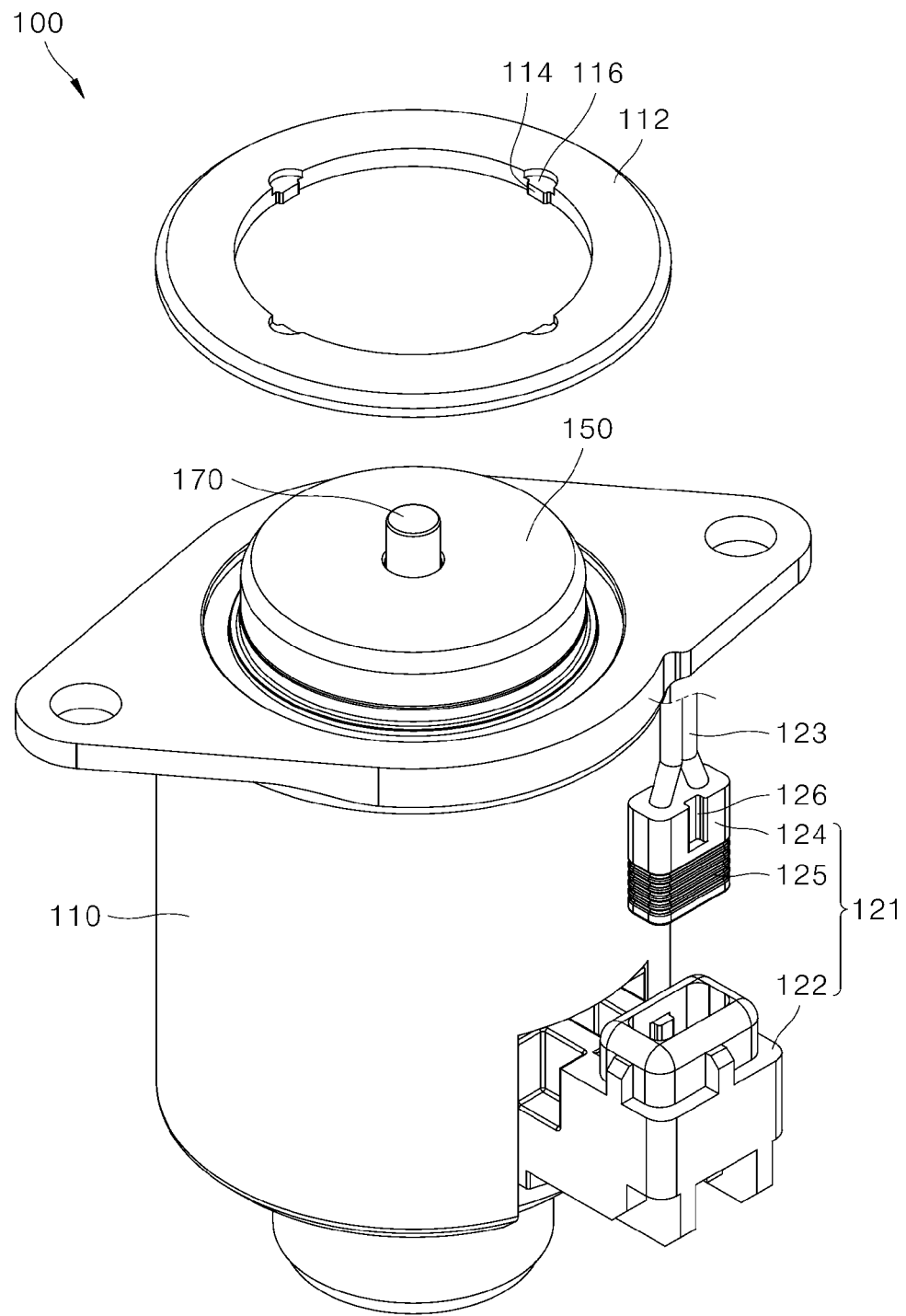
FIG. 2 is a perspective view illustrating the state of the spacer being separated in the solenoid actuator according to an embodiment of the present disclosure.

Preferred embodiments of the present disclosure are described with reference to the accompanying drawings in detail. Here, detailed descriptions of well-known technologies related to the present disclosure may be omitted to avoid obscuring the subject matter of the present disclosure. Additionally, in the drawings, the same reference numerals are used to denote identical or similar components.

As shown in the drawings, the solenoid actuator 100 according to an embodiment of the present disclosure includes a case 110, a housing 120, a cover 130, a bobbin assembly 140, a core 150, a plunger 160, and a rod 170.

The case 110 is formed as a hollow structure with both a top surface and a bottom surface open, and within the case 110, the housing 120, the bobbin assembly 140, the core 150, the plunger 160, and the rod (170) are accommodated.

The housing 120 is provided inside the case 110 and is formed to surround the perimeter of the bobbin assembly 140. On one side of the housing 120, a connector 121 for power and signal transmission is formed.

The connector 121 includes a connector body 122 formed integrally with the housing 120, a connector terminal (not shown) provided inside the connector body 122 for power and signal transmission, and a wire guide 124 to protect a wire 123 connected to the connector terminal (not shown).

The wire guide 124 is insert-molded inside the connector body 122 and has an approximately rectangular shape. Around the middle and bottom circumference of the wire guide 124, a plurality of grooves 125 are formed to enhance adhesion between the wire guide 124 and the connector body 122 during the insert molding.

Additionally, a slip prevention groove 126 is formed on the upper sides of the wire guide 124. The slip prevention groove 126 prevents the connector terminal (not shown) and wire 123 from being pushed out due to injection pressure during the molding of the bobbin assembly 140. Moreover, during the insert molding of the wire guide 124, part of the connector body 122 is inserted into the slip prevention groove 126, enhancing adhesion between the wire guide 124 and the connector body 122.

The open upper portion of the case 110 and housing 120 may be sealed by the core 150, while the open lower portion may be sealed by the cover 130. Here, the top of the case 110 is fixed to the core 150 to ensure a tight fit, while the bottom is curled to ensure a tight fit with the cover 130.

Fixing and curling the top and bottom of the case 110 in this way may not only prevent the ingress of foreign substances but also the movement of the components 120 to 170 stored in the case 100.

Meanwhile, on the upper surface of the case 110, a spacer 112 is provided to establish the assembly reference surface of the solenoid actuator 100.

This spacer 112 is formed in a ring shape surrounding the top of the core 150, which protrudes upward from upper surface of the case 110, to form the surface that comes into contact during the installation of the solenoid actuator 100 as a flat plane. Additionally, on the inner surface of the spacer 112, protrusions 114 that come into contact with the outer surface of the core 150 are protruded.

The protrusions 114 are arranged radially along the inner surface of the spacer 112 and are four in number, each having a deformation accommodation groove 116 formed on the top thereof. The deformation accommodation grooves 116 are intended to accommodate the deformation of the protrusions 114 in contact with the core 150 when the spacer 112 is forcibly inserted.

The spacer 112 is manufactured with various thicknesses to allow adjustment of the position of the assembly reference surface of the solenoid actuator 100. That is, by selectively using spacers 112 of different thicknesses, it may be universally applied to various assembly reference surfaces required in different types of systems.

Figure 4:
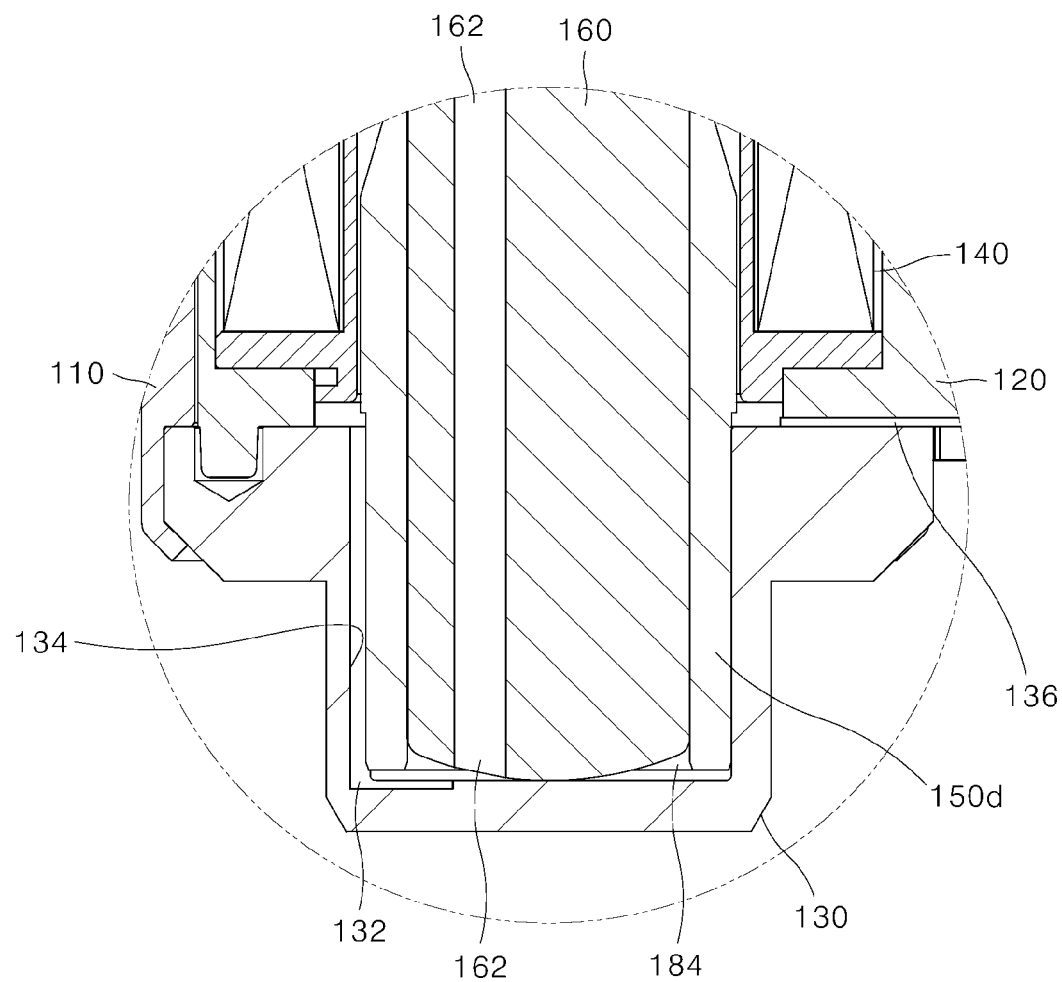
FIG. 4 is an enlarged view of area B in FIG. 3.

The cover 130 is formed in a multi-tiered cup shape to cover the bottom of the case 110, the housing 120, and the core 150. Between the cover 130 and the core 150, as well as between the cover 130 and the housing 120, passages 132 to 136 are formed to connect the operating space 180, which is described later, to the outside (see FIG. 4).

The passages 132 to 136 include the first passage 132 formed on the inner bottom of the cover 130, the second passage 134 formed on one side of the inner surface of the cover 130, and the third passage 136 formed on the bottom of the housing 120. The first passage 132 is connected to the operating space 180, the third passage 136 is connected to the outside, and the second passage 134 connects the first passage 132 and the third passage 136.

These passages 132 to 136 formed in this way to connect the operating space 180 to the outside allows movement of oil into and out of operating space 180 according to the movement of the plunger 160. The oil filled in the operating space 180 minimizes the operational resistance of the plunger 160, enhancing operability.

The bobbin assembly 140 includes a spool-shaped bobbin 142 and a coil 144 wound around the outer surface of the bobbin 142.

The bobbin 142 is formed in a hollow spool shape to accommodate the penetrating installation of the core 150 and made of insulating material to electrically isolate the coil 144 from the core 150.

The coil 144 generates a magnetic field when power is supplied, and the strength of the magnetic field generated by the coil 144 is proportional to the current flowing through the coil 144 and the number of turns of the coil 142 wound around the bobbin 142.

The core 150 serves as a stationary iron core, inducing a magnetic field generated by the bobbin assembly 140. The core 150 extends long in one direction and is coupled to penetrate the bobbin assembly 140 from top to bottom.

The core 150 consists of an upper body 150$u$ through which the rod 170 penetrates and a lower body 150$d$ where the plunger 160 is installed.

The upper body 150$u$ is formed in a multi-tiered cylindrical shape. On the middle circumference of the upper body 150$u$, a flange 152 with a larger diameter than the upper body 150$u$ is formed. Additionally, inside the upper body 150$u$, an attachment hole 154 for the installation of the rod 170 is formed along the central axis.

The lower body 150$d$ is a cylindrical shape extending downward from the lower surface of the upper body 150$u$. On the upper outer surface of the lower body 150$d$, a taper-shaped magnetic reinforcement groove 156 is formed to secure magnetic force, and inside the lower body 150$d$, the operating space 180 for the installation of the plunger 160 is formed.

The operating space 180 is composed of an upper space 182 and a lower space 184 partitioned by the plunger 160. In this case, the volumes of the upper space 182 and the lower space 184 change with the movement of the plunger 160.

For example, when power is supplied and the plunger 160 rises, the volume of the upper space 182 decreases, and the volume of the lower space 184 increases. Conversely, when power is cut off and the plunger 160 descends, the volume of the upper space 182 increases, and the volume of the lower space 184 decreases. That is, the volumes of the upper space 182 and the lower space 184 are inversely proportional to the movement of the plunger 160.

The upper space 182 is composed of the first upper space 182$a$ formed on the upper body 150$u$ side and the second upper space 182$b$ formed on the lower body 150$d$ side. In this case, the volume of the first upper space 182$a$ changes with the movement of the rod 170, and the volume of the second upper space 182$b$ changes with the movement of the plunger 160 and the rod 170 (See FIGS. 5 and 6).

For example, the volume of the first upper space 182$a$ is maximum when the rod 170 is at the lowest position and minimum when the rod 170 is at the highest position. Similarly, the volume of the second upper space 182$b$ is maximum when the plunger 160 and the rod 170 are at the lowest position, and minimum when the plunger 160 and the rod 170 are at the highest position.

The volume ratio of the first upper space 182$a$ to the second upper space 182$b$ varies in the range of 1:0.3 to 9 according to the movement of the plunger 160 and the rod 170.

Forming the volumetric ratio between the first upper space 182a and the second upper space 182b variably may enhance the operability of the plunger 160 and rod 170 by increasing the fluidity of oil into the operating space 180 through the mounting hole 154 of the core 150.

Figure 5:
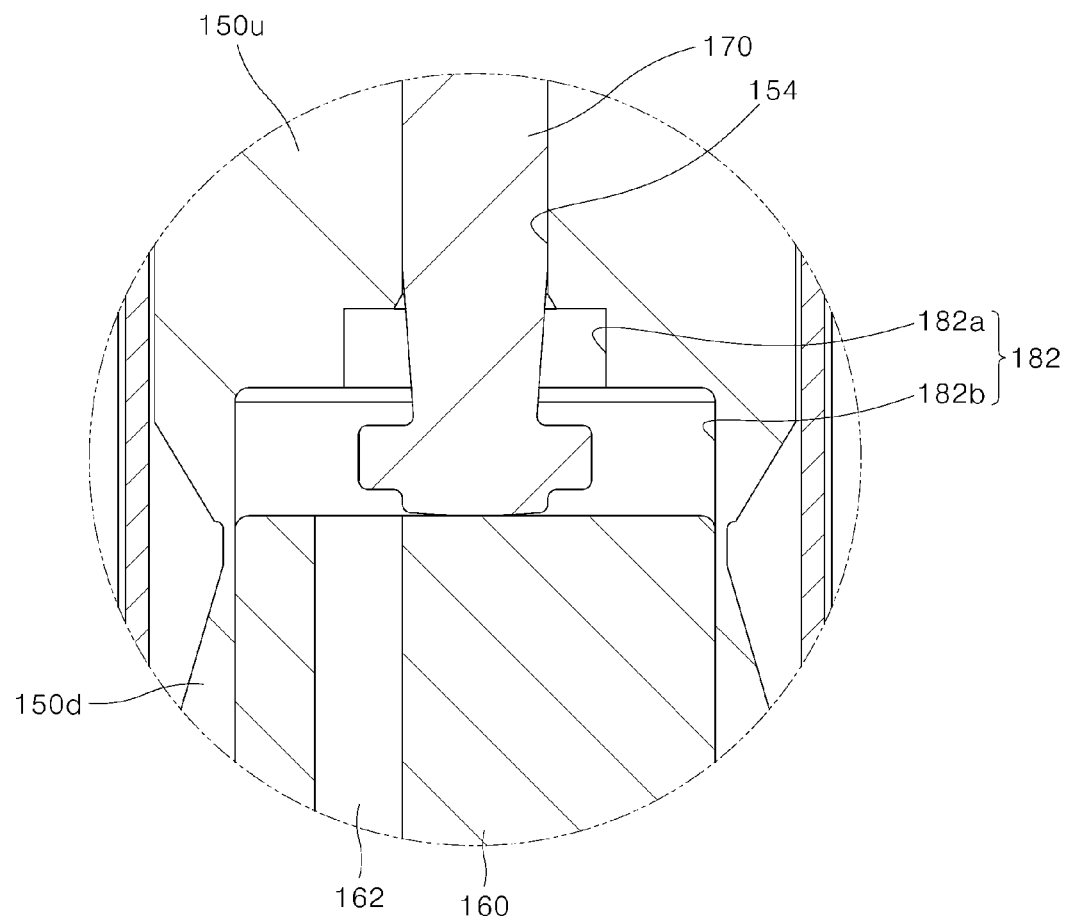
FIGS. 5 and 6 are an enlarged view of area C in FIG. 3.
Figure 6:
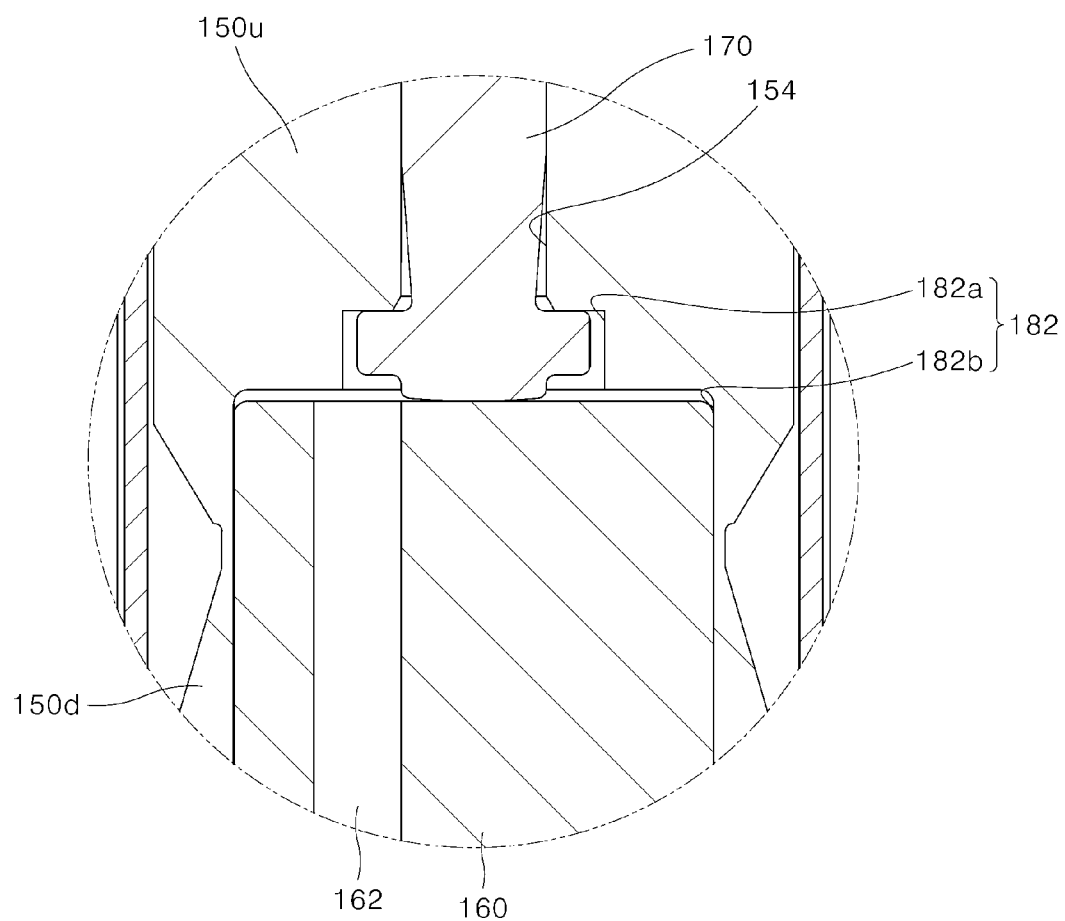

FIG. 5 illustrates the state where the plunger 160 and rod 170 are in the lowered position in this embodiment, while FIG. 6 illustrates the state where the plunger 160 and rod 170 are in the raised position. Additionally, Table 1 shows the volume changes of the first upper space 182a and the second upper space 182b according to the ascent and descent of the plunger 160 and rod 170.

TABLE 1

| | Stroke (mm) | | | | | |
|---|---|---|---|---|---|---|
| | 0 mm | 0.5 mm | 0.7 mm | 2.3 mm | 3.0 mm | 4.1 mm |
| | | | Volumes (cm$^3$) | | | |
| Chamber 1 | 0.053 cm$^3$ | 0.054 cm$^3$ | 0.055 cm$^3$ | 0.110 cm$^3$ | 0.109 cm$^3$ | 0.108 cm$^3$ |
| Chamber 2 | 0.016 cm$^3$ | 0.248 cm$^3$ | 0.284 cm$^3$ | 0.538 cm$^3$ | 0.895 cm$^3$ | 0.972 cm$^3$ |

With reference to FIGS. 5 and 6, assuming that the operating stroke is 0 mm when the plunger 160 and rod 170 are in the lowered position, and the operating stroke is 4.1 mm when the plunger (160) and rod (170) are in the raised position, the volume ratio of the first upper space 182a to the second upper space 182b increases at a rate of 1:0.3 to 9 as the operating stroke of the plunger 160 and rod 170 increases.

Particularly, in the main operating range of 0.7 to 3.0 mm for the solenoid actuator 100, it can be observed that the volume ratio between the first upper space 182a and the second upper space 182b sharply increases.

In this way, when the volume ratio of the first upper space 182a and the second upper space 182b rises sharply in the main operating range, the fluidity of the oil charged into the operating space 180 may increase, enhancing the operability of the plunger 160 and rod 170.

Figure 3:
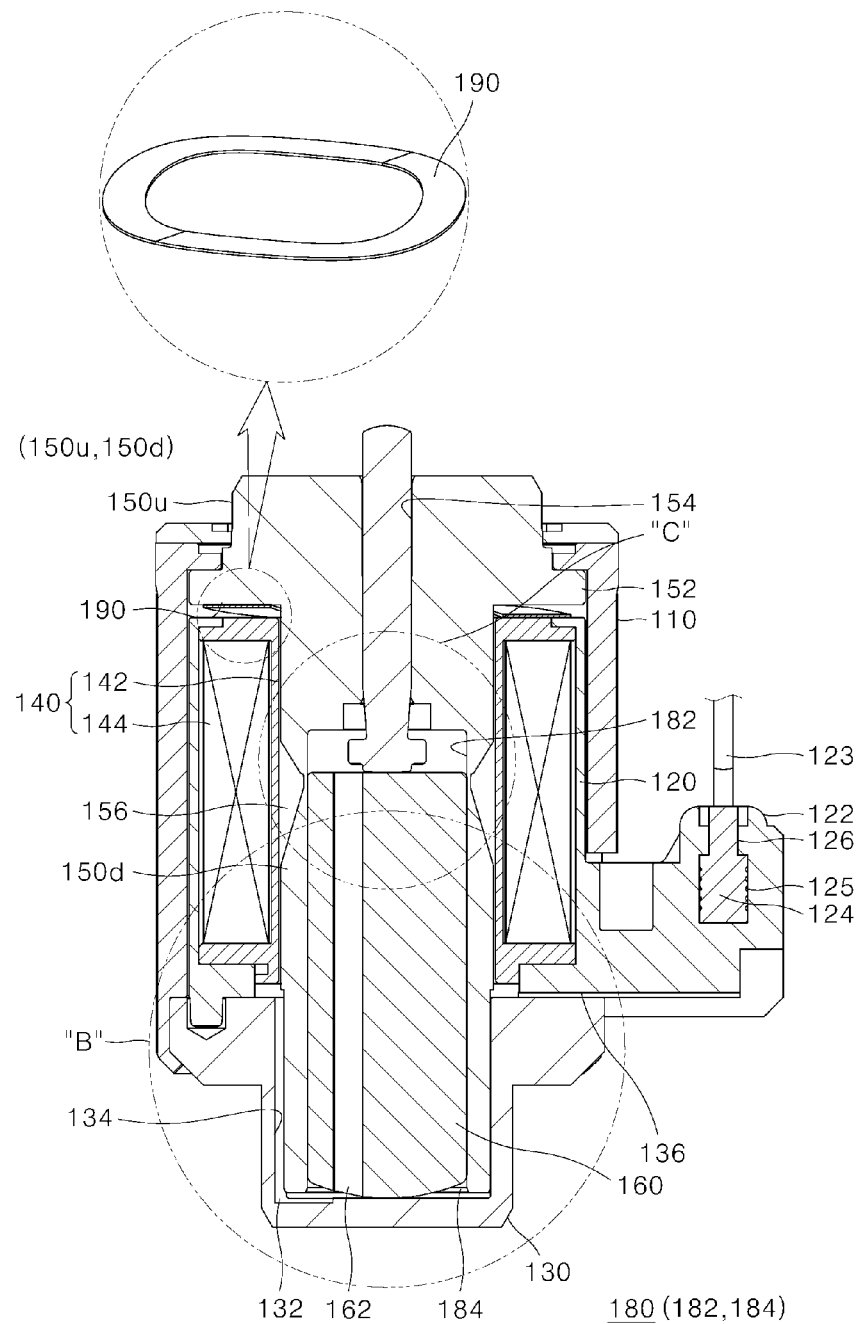
FIG. 3 is a cross-sectional view taken along line A-A' of FIG. 1.

Meanwhile, between the bobbin assembly 140 and the core 150, a deformation prevention means 190 is provided (See FIG. 3).

The deformation prevention means 190 may prevent the components such as the bobbin assembly 140 and core 150 stored inside the case 110 from being deformed or moving due to external forces.

The deformation prevention means 190 of this embodiment is a wave washer formed with ridges and valleys along the circumference, and when installed, it may apply preload in the longitudinal direction of the case 110 to prevent components from being deformed or moving due to external forces and further prevent malfunction due to component deformation.

The plunger 160 serves as an armature that moves by the magnetic field induced through the core 150 and is installed to be movable in the operating space 180. This plunger 160 is formed in a cylindrical shape with a predetermined length, and a passage 162 is formed inside the plunger 160.

In this way, forming a passage 162 in the plunger 160 may alleviate the operational resistance caused by the oil charged into the operating space 180. The passage 162 may be eccentrically positioned at a certain distance from the center of the plunger 160, which is to prevent the passage 162 from closing due to contact with the rod 170.

The rod 170 is a round shaft extending in one direction and installed to be movable in the mounting hole 154 formed in the upper body 152 of the core 150. The rod 170 moves by the plunger 160 and is either drawn out or inserted into the solenoid actuator 100.

The rod 170 of this embodiment is formed in a tapered shape, decreasing in diameter towards the bottom, so that the gap with the mounting hole 154 varies as the rod 170 moves. That is, when the rod 170 rises, the gap with the mounting hole 154 becomes maximum, and when the rod 170 descends, the gap becomes minimum.

Therefore, when power is supplied and the rod 170 rises, oil may easily flow through the widened mounting hole 154, thereby improving lubrication.

Although the above description has been provided with reference to the drawings illustrating examples of the present disclosure, the present disclosure is not limited to the embodiments and drawings disclosed in the specification, and it is obvious that various modifications can be made by those skill in the art within the scope of the technical concept of the present disclosure. Additionally, even though the operational effects resulting from the configuration of the present disclosure were not explicitly stated during the description of embodiments, it should be understood that effects predictable from such a configuration are also acknowledged.

The invention claimed is:

1. A solenoid actuator comprising:
a hollow case formed with open top and bottom surfaces;
a hollow housing integrated with a connector for power and signal transmission and mounted inside the case;
a bobbin assembly mounted inside the housing and connected to the connector;
a core penetrating the bobbin assembly, coupled to cover a top of the case and the housing, and having an operating space formed inside;
a cover covering a bottom of the case, the housing, and the core;
a plunger movably installed in the operating space;
a rod coupled to penetrate through the core and movable by the plunger;
a deformation preventer provided between the bobbin assembly and the core, preventing deformation and movement of components stored inside the case, and
a spacer coupled to an upper surface of the case,
wherein the spacer is formed in a ring shape surrounding the core and comprises protrusions formed on an inner surface thereof to contact the core, and
wherein the protrusions are arranged radially along the inner surface of the spacer, each having a groove formed on a top thereof to accommodate deformation caused by contact with the core.

2. The solenoid actuator of claim 1, wherein the deformation preventer is a wave washer.

3. The solenoid actuator of claim 1, wherein the connector integrated with the housing for power and signal transmission comprises a connector body formed integrally with the housing, a connector terminal provided inside the connector body for power and signal transmission, and a wire guide to protect a wire connected to the connector terminal.

4. The solenoid actuator of claim 3, wherein the wire guide is insert-molded into the connector body to secure the wire to the connector body and comprises a plurality of grooves formed around the wire guide to enhance adhesion to the connector body during insert molding.

5. The solenoid actuator of claim 4, wherein the wire guide comprises an anti-slip groove formed on one side to prevent the connector terminal and the wire from being pushed out of the connector body by injection pressure during insert-molding of the bobbin assembly.

* * * * *